May 19, 1964     L. SHELTON ETAL     3,133,569
EGG BREAKING AND SEPARATING HEAD ASSEMBLY
Filed Dec. 15, 1961     8 Sheets-Sheet 1

May 19, 1964 L. SHELTON ETAL 3,133,569
EGG BREAKING AND SEPARATING HEAD ASSEMBLY
Filed Dec. 15, 1961 8 Sheets-Sheet 3

United States Patent Office 3,133,569
Patented May 19, 1964

3,133,569
EGG BREAKING AND SEPARATING
HEAD ASSEMBLY
Leonard Shelton, 7709 Poppleton Plaza, Omaha, Nebr.,
and Kenneth G. Jones and Robert G. Bush, Green Bay,
Wis.; said Jones and said Bush assignors to said Shelton
Filed Dec. 15, 1961, Ser. No. 159,575
7 Claims. (Cl. 146—2)

This invention relates to an assembly for handling eggs and egg contents and, more particularly, to an egg breaking and separating head wherein an egg is split open and the contents of the egg collected in a whole egg cup or in separate egg yolk and egg white cups, and then dumped into suitably placed containers.

With the increased demand for egg products, either in whole egg form or separated egg yolks and egg albumen, or whites as they are generally referred to, there has been an evergrowing need for automatic machinery capable of handling eggs and separating their contents in a rapid, efficient, and economical manner. The machine must be capable of performing all the steps now generally done manually or semi-automatically, yet be low enough in cost and operation to justify its introduction into the egg processing equipment field. To meet the demands of the egg industry, the machine must be capable of handling eggs of substantially all sizes, shapes, and shell condition. Such a machine would eliminate the necessity to presize and presort the eggs before they are processed, which is a prerequisite to using the egg handling machines presently on the market.

The egg handling devices must be adaptable to collect whole eggs or to separate and collect egg yolks and egg whites. Also, since a certain percentage of the eggs will contain dark yolks, mixed white or inedible egg products, mechanisms must be provided to dump these egg products in separate containers. Furthermore, provisions must be made to facilitate cleaning of the various parts of the egg handling mechanisms to prevent the mixing of good and bad egg products and to replace various parts of the equipment in the event of wear.

In accordance with the present invention, there is provided an egg breaking and separating head assembly that meets all of the requirements set forth above. In the head assembly in question, an egg supplied thereto is split open and the contents thereof are collected in one cup or collected separately in an egg yolk cup and an egg white cup. To accomplish this, there is provided an egg holder in which an egg is clamped in place therein to prevent movement of the egg relative to the holder. The shape of the egg holder enables it to handle eggs of substantially any size or shape, and the clamping arrangement employed is constructed and arranged to handle, without crushing, cracked or leaking eggs as well as whole eggs. The egg is then cut in half by a knife and the egg shell halves separated to drain the egg contents into a separating mechanism located below the opened egg. The separating mechanism disclosed herein consists of a first cup adapted to receive the egg yolk and a second much larger cup located below the egg yolk cup which receives the egg albumen that overflows from the egg yolk cup. To obtain more positive separation between the egg yolk and egg albumen, a clipping cup is provided above the yolk cup to remove the albumen that tends to adhere to the edges of the egg yolk cup. The egg cups are subsequently rotated to empty their contents into preselected containers.

Each of the head assemblies includes suitable control mechanisms that are actuated in a predetermined manner to perform the clamping, cutting, clipping, and dumping operations hereabove referred to. These assemblies are constructed and arranged to process one egg within a certain range of movement and are then reset to handle a subsequent egg. A machine for processing a large number of eggs and egg products would be made up of a number of these assemblies mounted on a rotating support containing actuating means such as cams to actuate the control mechanisms on the head to perform the operations referred to above. A large automatic machine of the type in question, containing a plurality of egg breaking and separating heads, containers for collecting the egg products, operating means for selective emptying of the egg yolk and egg white cups, and washing apparatus for washing the heads when desired, is described in detail in the co-pending application Serial No. 174,966, filed February 23, 1962, and entitled Machine for Processing Eggs and Egg Products.

The structure by which the above and other advantages of the invention are attained will be described in the following specification, taken in conjunction with the accompanying drawings illustrating a preferred structural embodiment of the invention, in which.

The egg breaking and separating head assembly illustrated in the drawings consists of an egg breaking head 1 in which an egg is received, clamped, and split open to drain the contents thereof, and an egg collector 2 (see FIGURE 3) or an egg separating assembly 3 which separates the egg yolk from the egg white. The egg contents are then inspected (either visually, or electronically, the details of which are not part of the present invention) and the pertinent control mechanisms are positioned to effectuate dumping of the egg products into containers provided for the accumulation of egg yolks, special yolks such as dark yolks, "inedible" yolks, egg whites, whole eggs, mixed eggs, and inedible whites. One type of selector device is disclosed in detail in the aforementioned application entitled Machine for Processing Eggs and Egg Products.

The egg breaking head 1 and the manner in which it operates, although described in substance below, is described in detail in the copending application of Leonard Shelton, Ralph N. Beebee, and Thaddeus J. Tworek, Serial No. 143,850, filed October 9, 1961, and entitled Egg Breaking Head.

Figure 1:
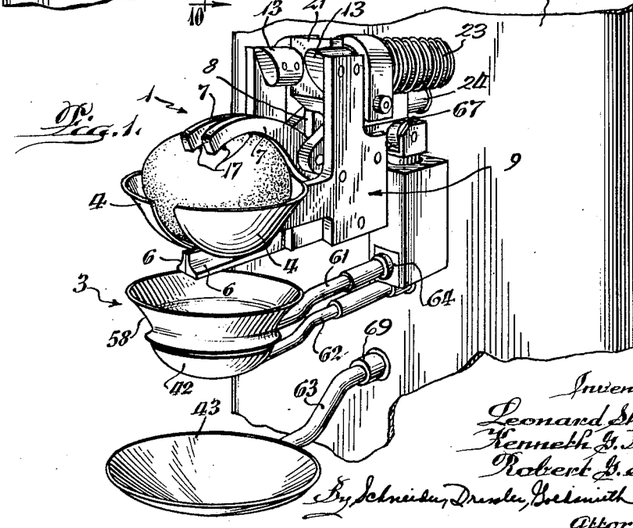
FIGURE 1 is a fragmental view, in perspective, of an egg breaking and separating head assembly having egg yolk and egg white cups projecting from the face thereof.
Figure 2:
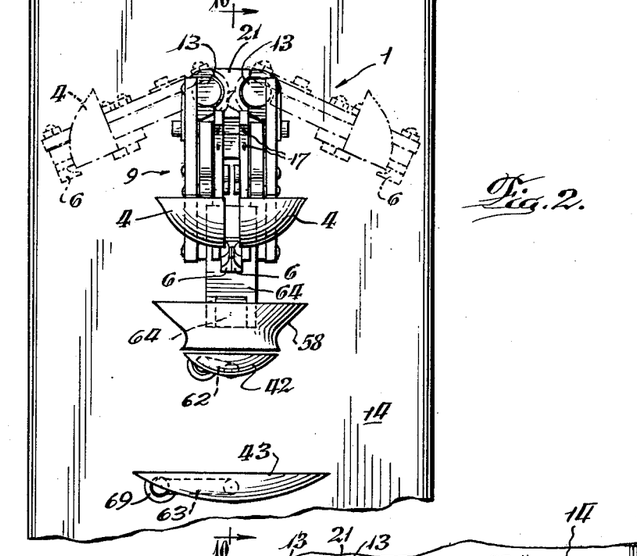
FIGURE 2 is a front elevation showing the head assembly in the egg receiving and egg dumping position.
Figure 10:
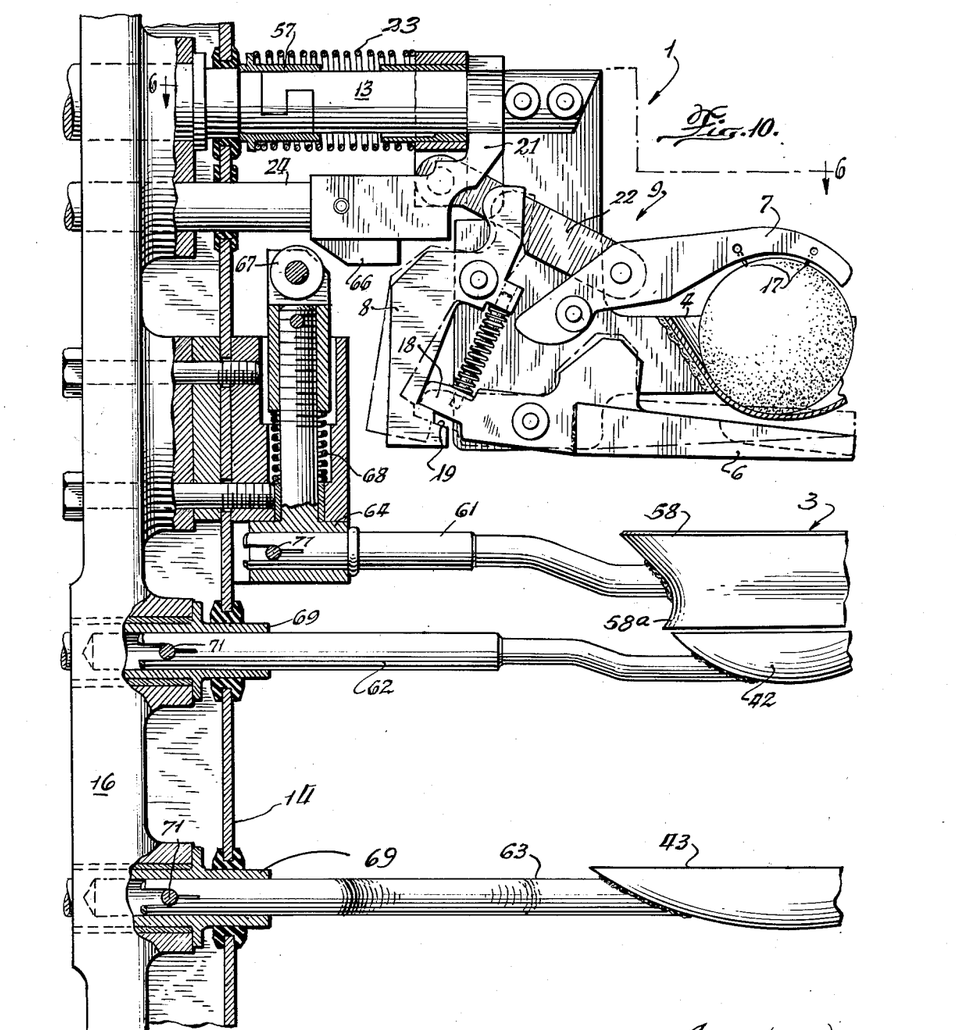
FIGURE 10 is an enlarged sectional view taken along lines 10—10 of FIGURE 2.

As shown in detail in FIGURES 1 and 10, the egg breaking head 1 has a pair of egg receiving cup halves 4, a pair of shell cutting knives 6, a pair of clamping fingers 7, and a pair of knife latches 8 mounted in cooperative sub-assemblies 9, each including a cup half, a knife, a knife latch, and a clamping finger. Each subassembly 9 is individually mounted for rotation about the axis of its individually mounted shaft 13 which extends through and is supported by the front plate 14 and main support casting 16 of the breaking and separating head assembly.

Figure 3:
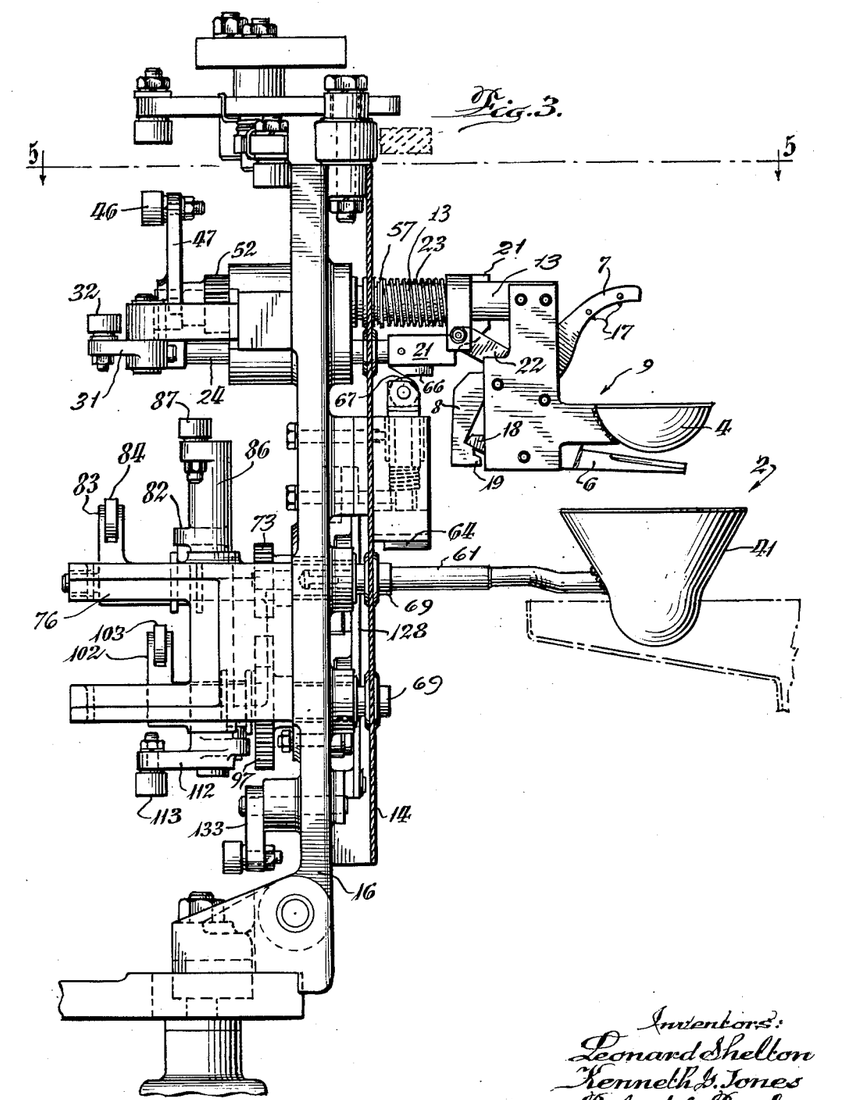
FIGURE 3 is a right side elevation of the egg breaking and separating head showing a whole egg cup mounted in place of separate egg yolk and white cups.
Figure 4:
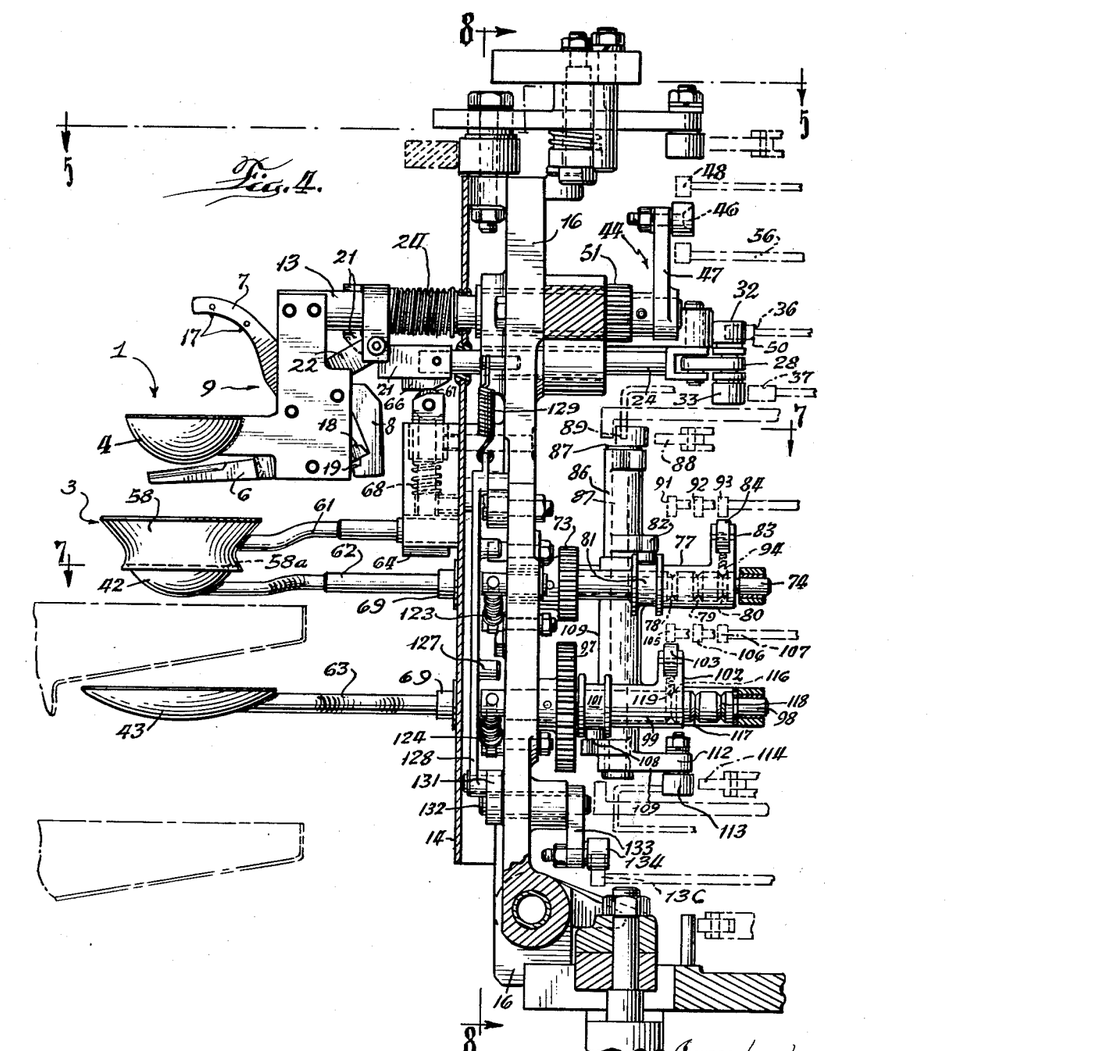
FIGURE 4 is a left side elevation of the head assembly and showing, in phantom, control mechanisms in their relative operating position with respect to the followers on the egg breaking and separating head.

With the fingers 7 in a raised position, as shown in FIGURES 3 and 4, an egg is dropped into the cup halves 4 while the cup halves are disposed in close proximity to each other, as shown in FIGURE 1. The clamping fingers 7 are then lowered onto the egg shell so that the holding points 17 thereon engage the shell and firmly hold the egg in position in the cup halves for cutting. The points 17 preferably do not pierce the egg shell, but instead settle into valleys on the surface of the shell.

When the egg is firmly clamped in place between the fingers and the cup half, the latches 8 for the knives 6 are tripped to move the lower ends of the latches rearwardly in such a manner that the rearward end 18 of each of the knife halves 6 is resiliently biased and moved to the lower step 19 on the latch 8 cooperating therewith. The knives pivotally move upwardly a preset, limited distance to sharply cut the egg shell without shattering the same, and without cutting or otherwise rupturing the yolk of the egg.

The lowering of the clamping fingers 7 and the tripping of the knife latches 8 are effected by controlled movement of a control block 21 that is constructed and arranged to cooperate with the linkage 22 which is connected to the clamping fingers 7, and to engage the knife latching mechanism. The control block 21 prevents the linkage 22 and associated clamping fingers from being biased in a downward direction by springs 23. Forward movement of the control block 21 permits the clamping fingers to descend upon the egg under the influence of the springs 23. The control block 21 is not fastened to the linkage 22 and thus is free to move further forward after the fingers engage the egg.

As the control block 21 moves to its forwardmost position, it engages and trips the knife latches 8 for operation of the knife in the manner described above. The movement of the control block 21 to effectuate the clamping and cutting action hereinbefore referred to is brought about by the controlled movement of follower mechanisms located on the back side of the breaking head.

Figure 5:
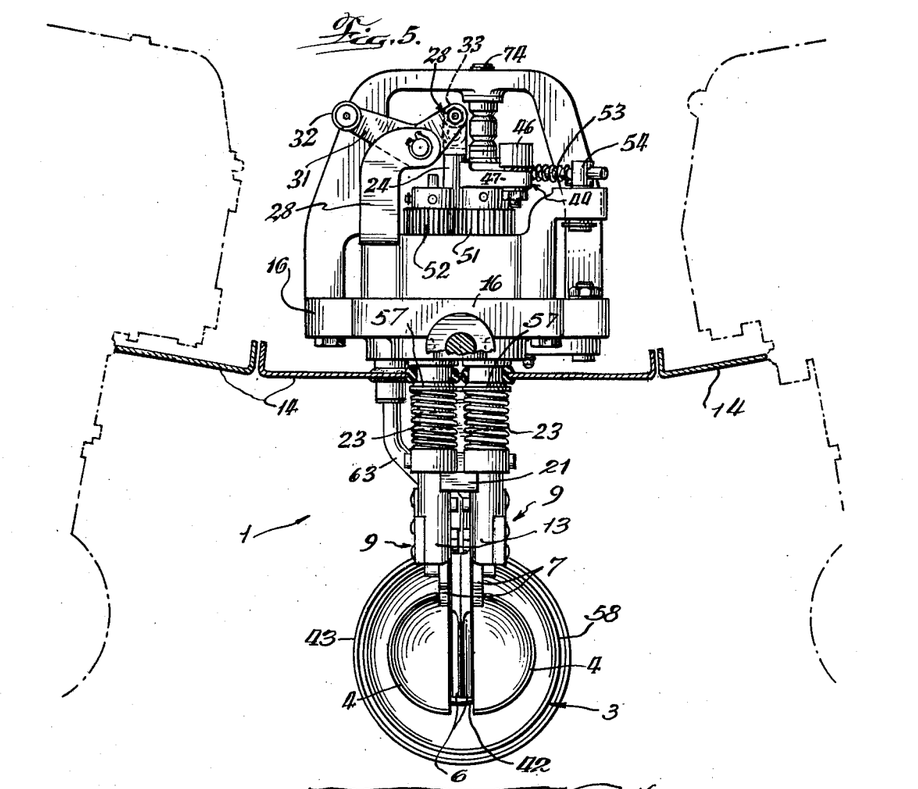
FIGURE 5 is a plan view taken along lines 5—5 of FIGURE 4.

As shown in FIGURES 4 and 5, the control block 21 is connected to a shaft 24 that extends through and is supported by the face plate 14 and main support casting 16. The control block 21 is moved through the action of a horizontally disposed bell crank 31 that is connected to the end of shaft 24 by a link 28. The bell crank 31 is pivotally connected to a finger control support arm 30 that is secured to the main support casting 16. Secured to the opposite ends of the bell crank 31 are followers 32, 33 that are adapted to be engaged by cams 36, 37, respectively (see FIGURE 4). The cam 36 is so designed that when it engages the follower 32, the crank arm is moved counterclockwise (see FIGURE 5) to withdraw the control block 21 to raise the clamping fingers 7 and set the knife latches 8. After an egg is disposed in the closed cup halves 4, the follower 32 is permitted by the cam 36 to move forwardly along with control block 21 by the action of the clamping finger biasing springs 23 to permit the fingers 7 to close down upon and clamp the egg.

After the egg is clamped in place, the follower 33 is contacted by the cam 37 to move the bell crank 31 clockwise and positively move the control block 21 forwardly to engage the knife latch 8 to move it out of contact with the knife end 18 to permit the knife to cut the egg shell. By the arrangement of the steps in the knife latch 8, penetration of the knife 6 into the shell between the opposed, clamped portions of the shell held by the individual sub-assemblies is limited so that the sharp movement thereof cleanly cuts the shell and does not break the surface membrane on the yolk.

The cam mechanisms referred to above for controlling the operation of the control rod and the other components of the egg breaking and separating head assembly are intended to be illustrative only since other electrical, pneumatic, or hydraulic devices capable of performing the equivalent functions could be used if desired.

Figure 11:
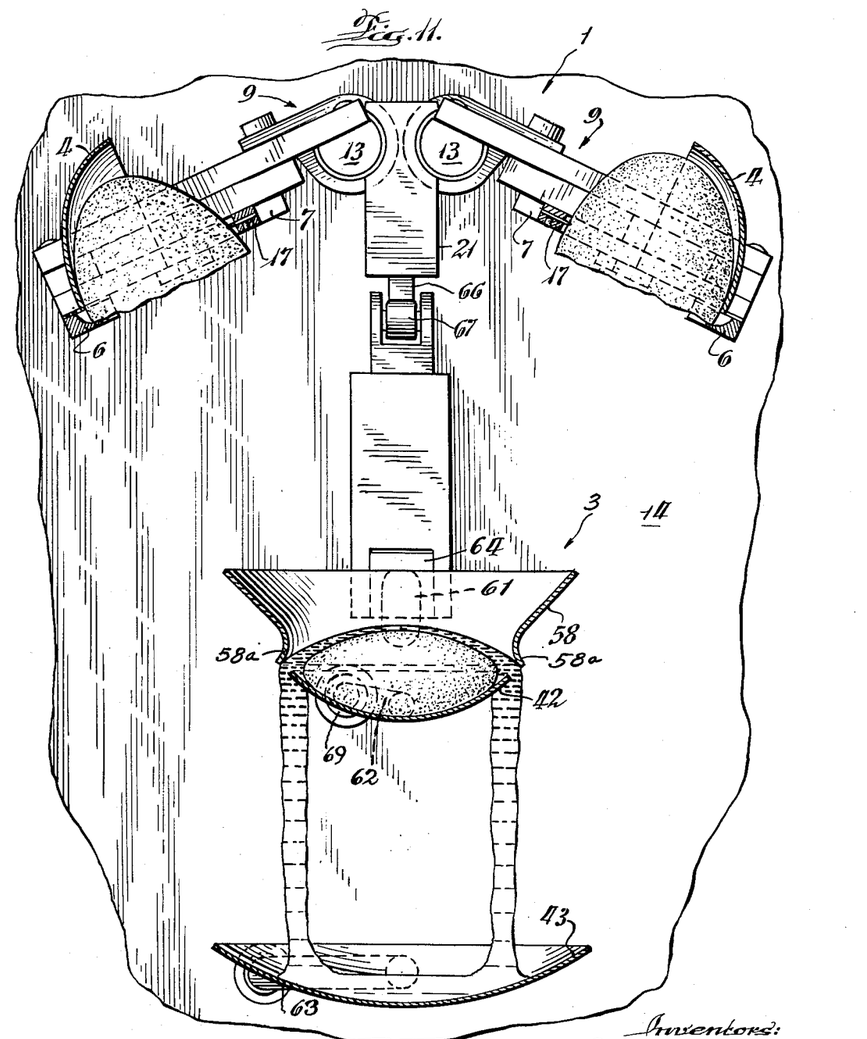
FIGURE 11 is an enlarged sectional front view of the head assembly with the egg cup halves moved apart and the contents separately collected in an egg yolk cup and an egg white cup disposed below the egg cup halves.

After the egg shell has been cut, the egg breaking sub-assemblies are pivoted outwardly about the axes of shafts 13, which are rotatably supported by the main support casting 16, to empty the contents of the shell into a container 41 for accepting whole eggs (see FIGURE 3), or into vertically disposed cups 42, 43 for separately collecting the egg yolk and egg albumen (see FIGURE 11).

The control mechanism for effecting pivotal movement of the sub-assemblies consists of a vertically disposed bell crank 44 that is connected to one of the shafts 13. The bell crank 44 has a follower 46 secured to an arm 47 that is adapted to be engaged by a head opening cam 48 to rotate the shaft 13 to which the bell crank 44 is secured. The two shafts 13 are connected together for symmetrical movement by intermeshing gears 51, 52. A spring-loaded over center toggle assembly 53 extends between the arm 45 of the bell crank 44 and a pin 54 secured to the support casting 16, as shown in FIGURE 5. The toggle assembly 53 holds the egg cup sub-assemblies 9 in their closed position to receive an egg, or in their separated positions during the dumping of the egg contents and the disposing of the shell depending on the position to which the toggle is moved. After the egg contents have been dumped, a cam 50 shown congruent with cam 36 engages roller 32 to move bell crank 31 counterclockwise to retract shaft 24 and control block 21 to lift fingers 7, thereby unclamping and dropping the opposed egg shell portions from each of the head sub-assemblies. The shells are dropped into a disposal pan for removal or further processing, as may be desired. A second cam 56 is provided to engage the follower 46 to return the egg cup halves 4 to the receiving position after the egg contents and egg shells have been dumped.

Figure 6:
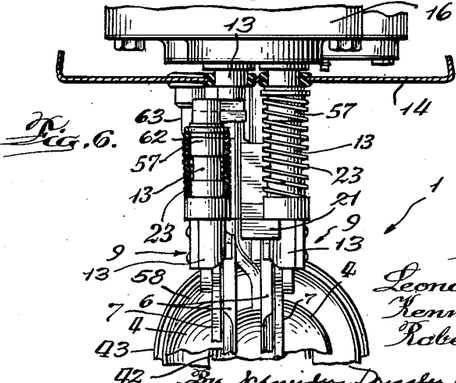
FIGURE 6 is a view taken along lines 6—6 of FIGURE 10 and shows one of the egg breaking head subassemblies partially removed.

Referring now to FIGURE 6, it can be seen that the egg breaking sub-assemblies 9 can be readily removed from the egg breaking and separating head for cleaning or for replacing any of the parts thereof. To this end, the shaft 24 is made in two parts and is covered at their juncture by a resiliently loaded sleeve guard 57.

After the egg shell halves are separated, the contents fall from the shell and flow through a funnel 58 into a whole egg cup 41, or into a yolk cup 42 from where the egg white overflows into a white cup 43, as selectively desired (see FIGURES 3 and 11). The funnel and egg cups are mounted on stems or arms 61, 62, and 63, respectively, that are rotatably mounted relative to the front plate 14 and main support casting 16 of the egg breaking and separating head.

Referring now to FIGURE 10, it is seen that the funnel or clipper arm 61 is releasably secured to a carrier 64 for reciprocation and cooperation of the clipper portion 58a of the funnel with the upper edge of the yolk cup 42.

As the control block 21 is retracted by the engagement of cam 50 with roller 32, the lower surface thereof operates as a cam 66 that engages roller 67 and moves it downwardly against compression spring 68. The carrier moves the funnel and clipper 58 to clip off the egg white adhering to the edge of the yoke cup.

The contents of the egg released from the egg shell flow through the wide mouth funnel to the yolk cup 42. The mouth of the funnel is specially arranged to be so wide that the yoke falling from the egg shell will not fall upon the edge of the funnel; and the neck of the funnel is arranged to be so small that the yolk will not fall upon the edge of the yolk cup. During normal egg shell emptying operations, some of the white or albumen will precede the yolk so that it will lubricate the surface of the funnel and run into the bottom of the yolk cup before the yolk arrives, whereby falling movement of the yolk is cushioned and lubricated. Much of the white will overflow into the white cup 43 when the yolk and white run into the yolk cup 42, but some of the egg white will cling to the yolk and to the yolk cup. As previously mentioned, reciprocating movement of the funnel and clipper brings the inner surface of the clipper portion 58a into engagement with the upper edge of the yolk cup 42 to clip off or cut the egg white that remains at the edge of the yolk cup by surface tension.

If it is desired to catch whole eggs rather than to separate egg yolks and egg whites, the funnel and clipper 58, and the yolk and white cups 42, 43, are removed and a whole egg cup 41 is substituted for the yolk cup 42, as shown in FIGURE 3.

Following the cutting, opening, and emptying of the contents of the egg shell into the egg yolk cup and egg white cup, and the releasing of the egg shell for dumping the same by withdrawal of the control block 21 to withdraw the clamping finger 7 from the shell portions and following clipping in the event that separating is desired, the egg contents are emptied into pans (shown in phantom in FIGURE 3) at appropriate stations. For example, the successive yolks may be separated as light or regular yolks, dark or other special yolks, and such yolks which are known as "inedible" yolks. Similar selective emptying of the white cups 43 at selected stations may be effected to separate good egg whites, mixed eggs, and egg whites known as inedible whites. These emptying operations for the yolk cup and the white cup, and for whole egg cups when the same are employed, are effected by rotation of the arms 62, 63 which are cam controlled from mechanisms in the back from each egg breaking and separating head. The mechanisms for selectively rotating the egg yolk and egg white cups to dump their contents into appropriately placed containers are described below.

Briefly, this is done by providing a longitudinally movable sleeve member on each carrier shaft which when engaged will rotate the particular egg cup to which it is connected. Each sleeve is movable to any one of three positions where it wil be engaged by a cam or other equivalent control device to dump the contents of the egg yolk and egg albumen cups when they are above the container designated to receive the particular contents in the cups.

Figure 7:
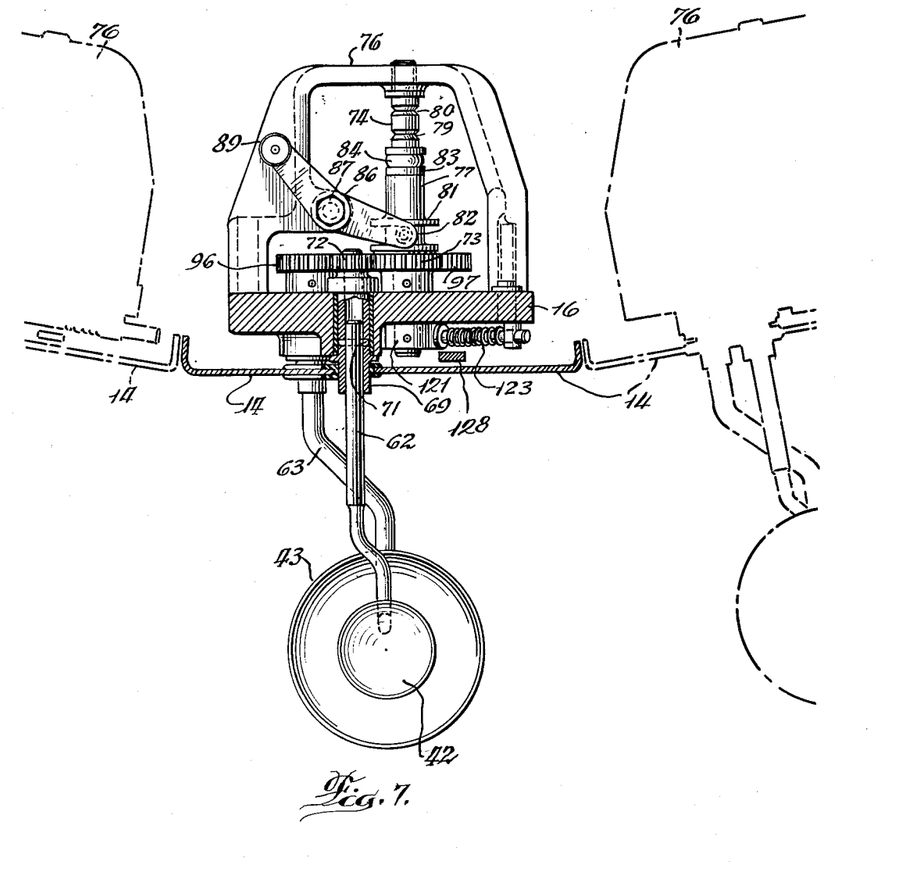
FIGURE 7 is a sectional view taken along lines 7—7 of FIGURE 4.

Referring first to the yolk cup, it is seen that the yolk cup stem is releasably connected to a sleeve 69, that is rotatably supported relative to casting 16, by a pin 71 (see FIGURE 7). Secured to the inner end of the sleeve 69 is a gear 72 that is driven by a gear 73 mounted on a carrier shaft 74 that extends through the face plate 14 and is rotatably supported by the main support casting 16 and shaft support casting 76.

As seen in FIGURES 4 and 7, a slide shaft 77 is longitudinally movable relative to carrier shaft 74, but rotational movement thereof will rotate gears 72, 73 and yolk cup stem 62. The slide shaft has a collar 81 at one end and a radially extending arm 83 at its other end that rotatably supports a follower 84. The collar 81 receives a pivot crank arm 82 that is rotatably mounted on a pin 87 that is fixed in position relative to the shaft support casting 76. The slide shaft 77 is movable between three positions 78, 79, 80, depending on whether the yolk cup contains a light yolk, a dark yolk, or an inedible yolk. The setting of the slide shaft 77 relative to the carrier shaft 74 into one of the three positions 78, 79, 80 is determined by a cam 88 which engages a follower 89 connected to the other end of the pivot crank 86 to rotate pivot crank arm 82 to move the slide shaft 77 to the preselected position. The slide shaft is retained in the position to which it is moved by a spring pressed detent 94. After the slide shaft is moved to the selected position, the follower 84 will be in position to be engaged by one of the cams 91, 92, or 93 to rotate the slide shaft 77, carrier shaft 74, gears 72, 73, and egg yolk cup 42 to dump the egg yolk into the chosen container. The cams 91, 92, 93 are located above containers for light, dark, and inedible yolks, respectively, so that the container into which the yolk cup will be emptied will depend on where follower 84 is located. The positioning of the cam 88 is determined by a selector means that is manually or automatically operated and one such arrangement is described in the aforementioned pending application entitled, Machine for Processing Eggs and Egg Products.

Referring now to the egg white cup 43, it is seen that a similar arrangement is provided for the selective dumping of the contents in this cup. The cup 43 is disposed immediately below yolk cup 42 to receive the egg white overflowing therefrom, but the stem 63 is horizontally spaced from stem 62 so that when cup 43 is rotated and dumped, it is moved completely out from under cup 42. The stem 62 is rotatably mounted in the main support casting 16 and has secured to its opposite end a gear 96, which gear is in engagement with a gear 97 mounted on the carrier shaft 98. Splined to the carrier shaft 98 is a slide shaft 99 that is identical to slide shaft 77 in that it has a collar 101 at one end and a radially extending arm 102 at its other end to which is secured a roller 103. The slide shaft 99 is movable between three positions 116, 117, 118 by a pivot crank 109 that is rotatably mounted relative to a pin 87 that is secured to the main support casting 16. The pivot crank 109 includes a first crank arm 108 within the collar 101 and a second arm 112 to which is connected a follower 113 that is adapted to be engaged by a cam 114 to move the slide shaft 99 and associated roller 103 relative to carrier shaft 92. After the slide shaft is positioned in place, it is retained in place relative to the carrier shaft 98 by the detent 119. Cams 105, 106, and 107 are located above the three positions in which roller 103 will be placed by the slide shaft 99, and the container over which the carrier shaft will be rotated to dump the egg white will depend on which cam engages the roller 103.

Figure 8:
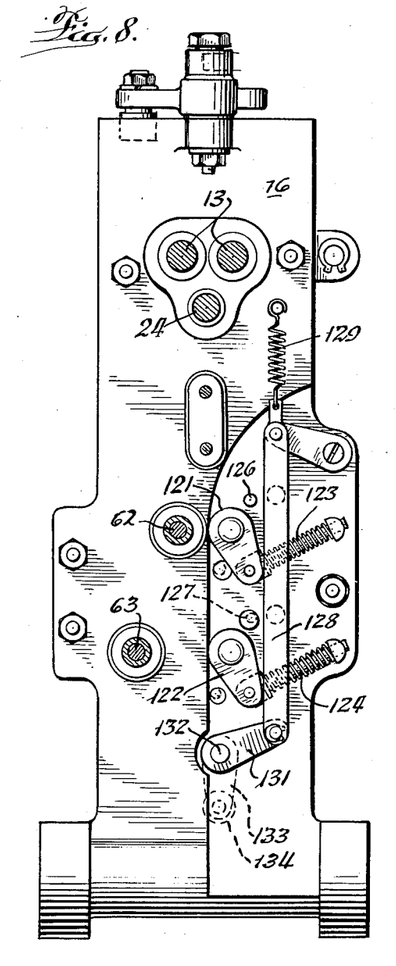
FIGURE 8 is a sectional view taken along lines 8—8 of FIGURE 4.
Figure 9:
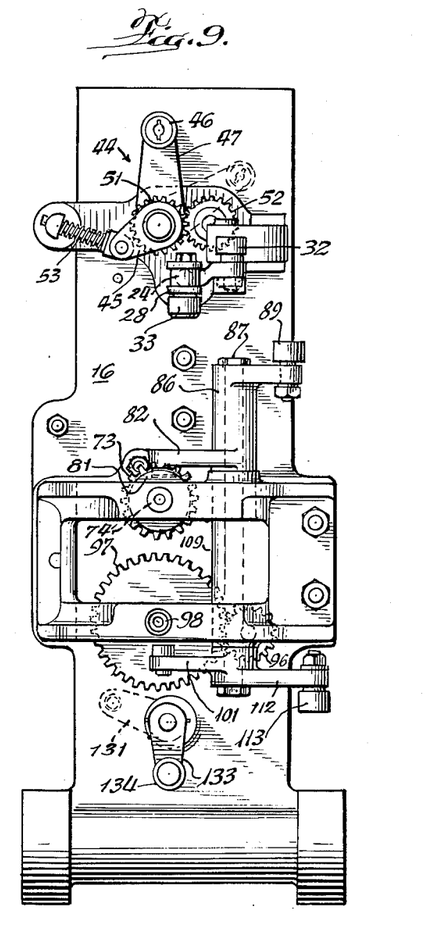
FIGURE 9 is a rear elevation of the egg breaking and separating head.

Referring now to FIGURES 4 and 8, it is seen that secured to the inner ends of carrier shafts 74, 98 between the face plate 14 and main casting 16 are crank arms 121, 122, respectively. The crank arms are part of over center toggle assemblies 123, 124 that retain the egg cups in the position in which they are placed by rotation of the carrier shafts. This is necessary so that each cup can be dumped in the selected container. For example, when the white cup is dumped, it will stay out of the way to permit the yolk cup to be dumped. In the position shown in FIGURE 8, the cups 42, 43 are shown being held in the upright position. When the cups are dumped the toggle assemblies 123, 124 will be moved overcenter and rest against stop pins 126, 127 to hold them in the dumping position. To reset the cups to the egg receiving position, there is provided a reset link 128 having rearwardly projecting pins which is spring biased upwardly by spring 129. Secured to the lower end of link 128 is a crank 131 which is connected by a shaft 132 to a second crank 133. Connected to crank 133 is a roller 134 which is adapted to be engaged by a cam 136 to rotate the cranks 133, 131 to pull the reset link 128 downwardly to reverse the position of the toggles 123, 124 and rerotate the shafts 62, 63 to their normal position with the cups 42, 43 opening upwardly. This completes the mechanical description of the complete egg breaking and separating head assembly and puts all the components in position to process another egg.

The method of operation of the egg breaking and separating head assembly is as follows:

After an egg is dropped into the egg cup halves 4, the shaft 24 and control block 21 are moved forwardly to permit the compression springs 13 to move the clamping fingers 7 into engagement with the top of the egg. Further forward movement of control block 21 brings it into engagement with latches 8 to allow knife halves 6 to move in between the egg cup halves to split the bottom shell of the egg. After the egg has been cracked open, the subassemblies 9 are rotated away from each other to drain the egg shell.

The entire contents of the egg flow through the clipping cup and funnel 58 into the egg yolk cup 42. The egg yolk cup 42 is not large enough to hold the entire contents of the egg with the result that the yolk stays in the yolk cup 42 and the egg drains thereover into the white cup 43. The control block 21 is then moved rearwardly to withdraw the clamping fingers 7 and dump the egg shells. During its rearward movement, the cam surface 66 on the bottom of control block 21 engages the roller 67 to move the roller and carrier 64 downwardly against the action of spring 68 to bring the clipping cup into clipping engagement with the yolk cup 42.

The contents of the egg yolk and egg white cups are inspected and the slide shafts 77 and 99 are positioned so that they will be rotated to dump the cups into the appropriate containers. When the cups are dumped, they are retained in that position by the toggle assemblies 123, 124. After the egg cups have been dumped, the arm 133 is rotated to move the reset link 128 downwardly to reverse the position of the toggles to rerotate the shafts 62, 63 to their normal position with the cups 42, 43 opening upwardly.

From the foregoing, it will be observed that numerous variations and modifications may be effected without departing from the true spirit and scope of the novel concepts of the invention. For example, the particular control mechanisms used to position the cups are merely representative of various mechanisms that could be used. If desired, an electrical, pneumatic, or different mechanical system could be used. Also, of course, the invention is not limited to the details of the particular egg breaking head shown in the drawings. These are but a few of the changes that could be made without affecting the basic concepts disclosed herein.

We claim:

1. An egg breaking and separating head comprising an egg holder, means for clamping and cutting an egg disposed in said egg holder, means for splitting the egg to empty the contents thereof, a first cup disposed below said egg holder and being smaller in volume than the contents of the egg, a second cup larger than the first cup and spaced directly below said first cup to receive the overflow from said first cup, a vertically movable clipping cup disposed above said first cup and adapted to engage said first cup to clip off the egg contents tending to adhere to the edges thereof, and means for adjusting the position of said egg clamping and cutting means and for controlling the vertical movement of said clipping cup relative to said first cup.

2. An egg breaking and separating head comprising means for holding, clamping and cutting an egg into halves, means for separating the egg halves to empty the contents therefrom, a first cup disposed below said egg holding means and being smaller in volume than the contents of the egg, a second cup larger than said first cup and vertically disposed below said first cup to receive the overflow therefrom, a clipping cup assembly disposed above said first cup and longitudinally movable relative to said head, means for vertically moving said clipping cup to move it into engagement with said first cup to clip off the contents of the egg tending to adhere to the edge thereof, stem means secured to each of said cups, means for rotatably mounting said stems relative to said head assembly, means for rotating each of said cups including a shaft, a longitudinally movable sleeve secured to each shaft, means on said sleeve and shaft assembly adapted to be engaged to rotate both cups, and means for positioning said sleeves longitudinally relative to their respective shafts to selectively position the sleeves whereby the cups will be dumped into various preselected containers.

3. An egg breaking and separating head in accordance with claim 2 including means for retaining the egg cups in an inverted position until they are dumped, and reset means for returning the cups to the upright position to receive the contents of a subsequent egg.

4. An egg breaking and separating head comprising an egg holder, means for clamping and cutting an egg disposed in said egg hold, means for separating the egg sections to empty the contents thereof, a first cup disposed below said egg holder and having smaller volume than the contents of the egg, a second cup larger than the first cup and spaced directly below said first cup to receive the overflow from said first cup, a vertically movable clipping cup assembly disposed above said first cup and reciprocably mounted relative to said head, means for adjusting the position of said egg clamping and cutting means and for controlling the movement of said clipping cup including interengaging cam means connected to said last-mentioned means and said clipping cup assembly whereby movement of said position adjusting means will bring the clipping cup into shearing contact with said first cup to cut off the egg product tending to adhere thereto.

5. An egg breaking and separating head including a mechanism for breaking an egg and emptying the contents therefrom and an egg separating and dumping assembly, said egg separating and dumping assembly comprising a first cup disposed below said egg breaking mechanism that is smaller in volume than the contents of the egg whereby it will receive the egg yolk and the egg white will overflow, a second cup larger than the first cup and spaced below said first cup to receive said overflow, cup operating means connected to each of said cups and rotatably mounted relative to said head, said operating means each including a longitudinally movable sleeve means adapted to be engaged for rotating said cups, means for selectively positioning said sleeve means whereby the egg cups may be dumped into various preselected containers, means for retaining said cups in the dumped position and means for resetting the egg cups to their normal position to receive a subsequent egg.

6. An egg breaking and separating head including a mechanism for breaking an egg and emptying the contents therefrom and an egg separating and dumping assembly, said egg separating and dumping assembly comprising a first cup disposed below said egg breaking mechanism and having a smaller volume than the contents of the egg being broken whereby it will receive the egg yolk and the egg white will overflow, a second cup larger than the first cup and spaced immediately below said first cup to receive said overflow, stem means connected to each of said cups and rotatably mounted relative to said head, operating means for each cup and stem means and adapted to be engaged for rotating said cups, means for selectively positioning said operating means whereby the egg cups may be dumped into various preselected containers, overcenter spring means connected to said head and operative to retain the cups in their dumped position, and means for moving said overcenter means to reset the egg cups in their normal position to receive a subsequent egg after the egg products have been dumped.

7. An egg breaking and separating head including a mechanism for breaking an egg and emptying the contents therefrom and an egg separating and dumping assembly, said egg separating and dumping assembly comprising a first cup disposed below said egg breaking mechanism and having a smaller volume than the contents of the egg being broken whereby it will receive the egg yolk and the egg white will overflow, a second cup larger than the first cup and spaced immediately below said first cup to receive said overflow, stem means connected to each of said cups and rotatably mounted relative to said head, operating means for each cup and stem means, said operating means each including a longitudinally movable sleeve adapted to be engaged for rotating said cups, means for selectively positioning said operating means whereby the egg cups may be dumped into various preselected containers, overcenter spring means connected to said head and operative to retain the cups in their dumped position, and means for moving said overcenter means to reset the egg cups in their normal position to receive a subsequent egg.

References Cited in the file of this patent

UNITED STATES PATENTS

| | | |
|---|---|---|
| 1,507,221 | Weiss | Sept. 2, 1924 |
| 2,031,294 | Young et al. | Feb. 18, 1936 |
| 2,718,906 | Adams et al. | Sept. 27, 1955 |
| 2,815,055 | Willsey | Dec. 3, 1957 |
| 2,966,184 | Willsey | Dec. 27, 1960 |
| 3,082,804 | Shelton | Mar. 26, 1963 |